United States Patent [19]

Scheifele, Jr.

[11] 4,333,819

[45] Jun. 8, 1982

[54] SEPARATION AND RECOVERY OF HYDROGEN AND NORMALLY GASEOUS HYDROCARBONS FROM NET EXCESS HYDROGEN FROM A CATALYTIC REFORMING PROCESS

[75] Inventor: Clifford A. Scheifele, Jr., Glendale Heights, Ill.

[73] Assignee: UOP Inc., Des Plaines, Ill.

[21] Appl. No.: 228,518

[22] Filed: Jan. 26, 1981

[51] Int. Cl.$^3$ .................. C10G 47/00; C10G 49/22
[52] U.S. Cl. .................. 208/101; 208/134; 208/138; 585/655
[58] Field of Search .............. 208/101; 585/655; 208/134, 138

[56] References Cited

U.S. PATENT DOCUMENTS

| | | | |
|---|---|---|---|
| 3,431,195 | 3/1969 | Storch et al. | 208/101 |
| 3,470,084 | 9/1969 | Scott | 208/101 |
| 3,520,799 | 7/1970 | Forbes | 208/101 |
| 3,520,800 | 7/1970 | Forbes | 208/101 |
| 3,882,014 | 5/1975 | Monday et al. | 208/101 |
| 4,159,937 | 7/1979 | Scott | 208/101 |
| 4,212,726 | 7/1980 | Mayes | 208/101 |

*Primary Examiner*—Curtis R. Davis
*Attorney, Agent, or Firm*—James R. Hoatson, Jr.; Robert W. Welch; William H. Page, II

[57] ABSTRACT

A process is disclosed for the catalytic reforming of hydrocarbons in the presence of hydrogen, preferably to produce high quality gasoline boiling range products. An improved recovery of normally gaseous hydrocarbons from the net excess hydrogen is realized by chilling and contacting said hydrogen with a normally liquid hydrocarbon stream in a plural stage absorption zone at an elevated pressure.

7 Claims, 1 Drawing Figure

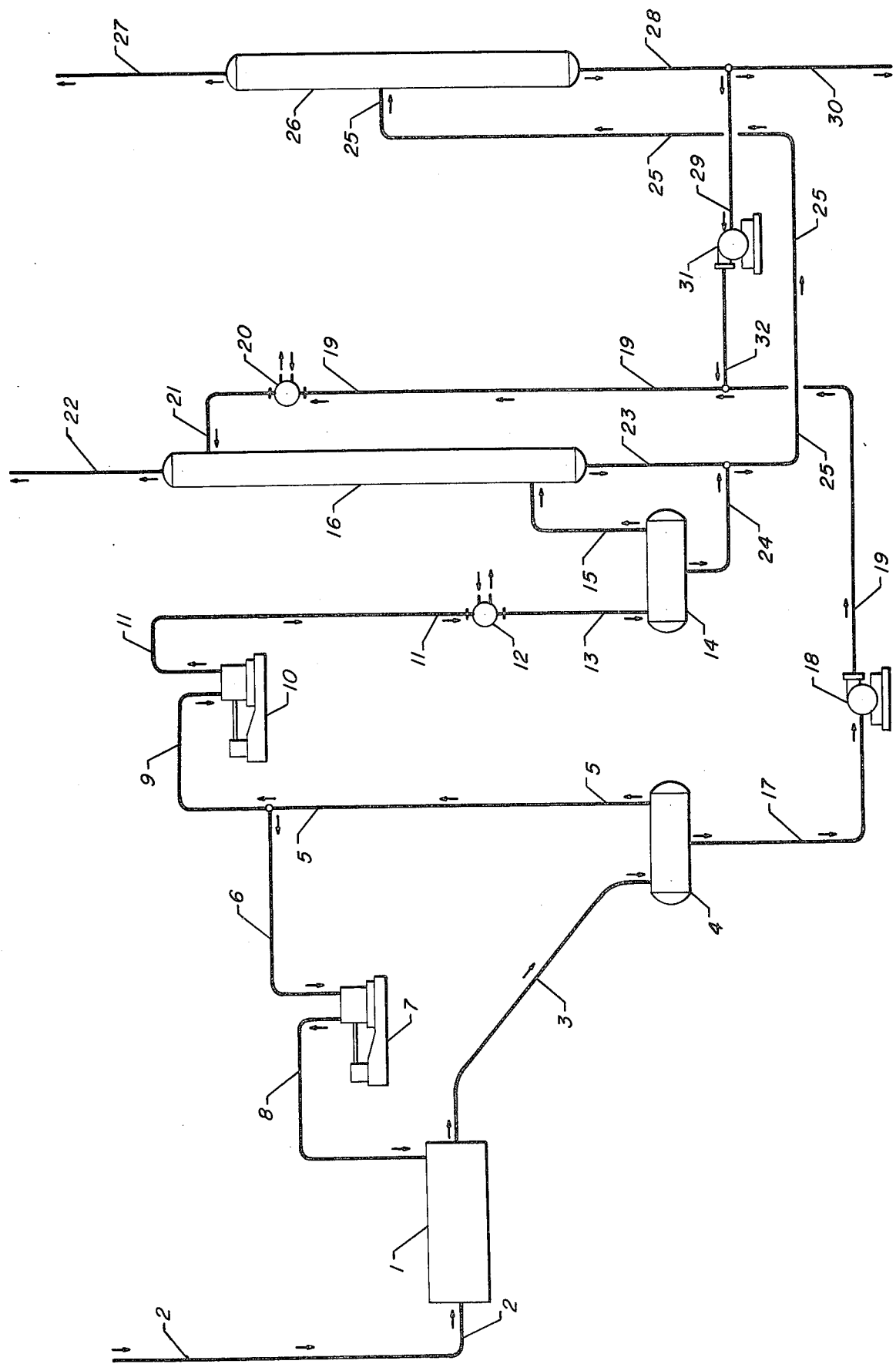

SEPARATION AND RECOVERY OF HYDROGEN AND NORMALLY GASEOUS HYDROCARBONS FROM NET EXCESS HYDROGEN FROM A CATALYTIC REFORMING PROCESS

This invention relates to a hydrocarbon conversion process effected in the presence of hydrogen, especially a hydrocarbon conversion process involving dehydrogenation. More particularly, this invention relates to a catalytic reforming process to convert a hydrocarbon feedstock into gasoline boiling range products, and is specifically directed to the recovery of light, normally gaseous hydrocarbons from admixture with the net excess hydrogen effluent from said process.

It is well known that high quality products in the gasoline boiling range including, for example, aromatic hydrocarbons such as benzene, toluene and the xylenes, are produced by the catalytic reforming process wherein a naphtha fraction is passed in contact with a platinum-containing catalyst in the presence of hydrogen. One of the predominant reactions of the reforming process involves the dehydrogenation of naphthenic hydrocarbons. While a considerable portion of the resulting hydrogen is required for recycle purposes to maintain a desired hydrogen partial pressure over the reforming catalyst, a substantial net excess of hydrogen is available for other uses, for example, the hydrotreating of sulfur-containing hydrocarbon feedstocks.

However, catalytic reforming also involves a hydrocracking function, among the products of which are relatively low molecular weight hydrocarbons including the normally gaseous hydrocarbons such as methane, ethane, propane and the butanes, and a substantial amount of these normally gaseous hydrocarbons is recovered admixed with the hydrogen separated from the reforming reaction zone effluent. While modern continuous catalytic reforming is somewhat more tolerant of these normally gaseous hydrocarbons in the hydrogen recycle gas, their presence in the net excess hydrogen from the reforming process is frequently objectionable and requires separation. Further, it is often desirable to maximize the recovery of said normally gaseous hydrocarbons, especially ethane, propane and the butanes, to satisfy a demand by other hydrocarbon conversion or organic synthesis processes.

It is therefore an object of this invention to present an improved process for the conversion of hydrocarbons in the presence of hydrogen, especially a hydrocarbon conversion process involving hydrocarbon dehydrogenation. It is a further object to provide a catalytic reforming process to convert a hydrocarbon feedstock into gasoline boiling range products. And it is a specific object to provide a process for purifying the net excess hydrogen from a catalytic reforming process while maximizing the recovery of normally gaseous hydrocarbons contained therein.

In one of its broad aspects, the present invention embodies a process for converting hydrocarbons in the presence of hydrogen which comprises the steps of: (a) contacting said hydrocarbons with a catalyst in the presence of hydrogen at hydrocarbon conversion conditions to produce an effluent stream comprising hydrogen admixed with hydrocarbon conversion products; (b) separating said effluent at a relatively low pressure into a gaseous stream comprising hydrogen admixed with light hydrocarbon conversion products and a liquid stream comprising the heavier hydrocarbon conversion products; (c) contacting at least a portion of said gaseous stream with a hereinafter specified lean oil in a plural stage absorption zone at a relatively high pressure, and at a temperature of from about 0° to about 55° F., to produce a relatively pure hydrogen stream and a light hydrocarbon-enriched oil stream; (d) recovering the relatively pure hydrogen stream; (e) introducing the enriched oil stream into a fractionation zone at conditions to produce an overhead fraction comprising said light hydrocarbon conversion products, and a fraction comprising the heavier conversion products; and, (f) combining the liquid hydrocarbon stream from step (b) with a portion of the heavier hydrocarbon fraction from step (e) and passing the combination into said plural stage absorption zone as said specified lean oil.

Another embodiment of this invention includes the above process wherein the gaseous stream from step (b) is treated at a relatively high pressure, and at a temperature of from about 0° to about 55° F. to condense and separate a portion of said light hydrocarbon conversion products prior to further treatment in accordance with step (c).

A still further embodiment includes the above process wherein said gaseous stream of step (c) is contacted with said lean oil at a pressure of from about 350 to about 550 psig. and at a temperature of from about 35° to about 45° F.

Other objects and embodiments of this invention will become apparent in the following more detailed specification.

Heretofore, the separation of normally gaseous hydrocarbons from admixture with a hydrogen stream which has been recovered from the effluent of a hydrocarbon conversion process effected in the presence of hydrogen, has been accomplished by admixing the gaseous hydrocarbon-containing hydrogen stream with a liquid hydrocarbon stream at an elevated pressure whereby the gaseous hydrocarbons are absorbed in the liquid hydrocarbon stream to yield a relatively pure hydrogen stream. For example, in U.S. Pat. No. 3,431,195, the effluent from a dehydrogenation reaction zone is separated at a relatively low pressure into a gaseous hydrocarbon-containing hydrogen stream and a normally liquid hydrocarbon stream. The gaseous stream is then admixed with the normally liquid hydrocarbon stream at an elevated temperature whereby the gaseous hydrocarbons are absorbed in the liquid hydrocarbon stream to yield a relatively pure hydrogen stream and a dehydrogenated hydrocarbon product. More recently, U.S. Pat. No. 3,520,799 has disclosed a process in which the relatively pure hydrogen stream produced by the process of U.S. Pat. No. 3,431,195 is further treated in a plural stage absorption zone in contact with a bottoms fraction from a reforming system stabilizer column at an elevated temperature. Further, normally gaseous hydrocarbons are absorbed in said bottoms fraction, and the resulting hydrogen stream is recovered and chilled to condense residual hydrocarbons contained therein.

The present invention represents a further improvement in the art as set forth above. As will become apparent, the process of this invention provides for the recovery of a purified hydrogen stream from the net excess hydrogen from a hydrocarbon conversion process involving dehydrogenation, and affords a substantial improvement in the recovery of normally gaseous hydrocarbon conversion products therefrom.

The art of catalytic reforming is well known to the petroleum refining industry and does not require detailed description herein. In brief, the catalytic reforming art is largely concerned with the treatment of a petroleum gasoline fraction to improve its anti-knock characteristics. The petroleum fraction may be a full boiling range gasoline fraction having an initial boiling point in the 50°–100° F. range and an end boiling point in the 350°–425° F. range. More frequently, the gasoline fraction will have an initial boiling point in the 150°–250° F. range and an end boiling point in the 350°–425° F. range, this higher boiling fraction being commonly referred to as naphtha. The reforming process is particularly applicable to the treatment of those straight-run gasolines comprising relatively large concentrations of naphthenic and substantially straight chain paraffinic hydrocarbons which are amenable to aromatization through dehydrogenation and/or cyclization. Various other concomitant reactions also occur, such as isomerization and hydrogen transfer, which are beneficial in upgrading the selected gasoline fraction.

Widely accepted catalysts for use in the reforming process typically comprise platinum on an alumina support. These catalysts will generally contain from about 0.05 to about 5 wt.% platinum. More recently, certain promoters or modifiers, such as cobalt, nickel, rhenium, germanium and tin, have been incorporated into the reforming catalyst to enhance the reforming operation.

Catalytic reforming is a vapor phase operation effected at hydrocarbon conversion conditions which include a temperature of from about 500° to about 1050° F., and preferably from about 600° to about 1000° F. Other reforming conditions include a pressure of from about 50 to about 1000 psig., preferably from about 85 to about 350 psig., and a liquid hourly space velocity (defined as liquid volume of fresh charge per volume of catalyst per hour) of from about 0.2 to about 10. The reforming reaction is carried out in the presence of sufficient hydrogen to provide a hydrogen to hydrocarbon mole ratio of from about 0.5:1 to about 10:1.

The catalytic reforming reaction is carried out at the aforementioned reforming conditions in a reaction zone comprising either a fixed or a moving catalyst bed. Usually, the reaction zone will comprise a plurality of catalyst beds, commonly referred to as stages, and the catalyst beds may be stacked and enclosed within a single reactor, or the catalyst beds may each be enclosed at a separate reactor in a side-by-side reactor arrangement. Generally, a reaction zone will comprise 2-4 catalyst beds in either the stacked or side-by-side configuration. The amount of catalyst used in each of the catalyst beds may be varied to compensate for the endothermic heat of reaction in each case. For example, in a three catalyst bed system, the first bed will generally contain from about 10 to about 30 vol.%, the second from about 25 to about 45 vol.%, and the third from about 40 to about 60 vol.%. With respect to a four catalyst bed system, suitable catalyst loadings would be from about 5 to about 15 vol.% in the first bed, from about 15 to about 25 vol.% in the second, from about 25 to about 35 vol.% in the third, and from about 35 to about 50 vol.% in the fourth.

The reforming operation further includes the separation of a hydrogen-rich vapor phase from the reaction mixture recovered from the reforming zone, at least a portion of which is recycled to the reforming zone. This separation is usually effected at substantially the same pressure as employed in the reforming zone, allowing for pressure drop in the system, and at a temperature of from about 60° to about 120° F. to yield a vapor phase comprising relatively pure hydrogen. A principally liquid phase is further treated in a fractionation column for the recovery of reformed product, commonly referred to as reformate.

The further description of the present invention is presented with reference to the attached schematic drawing. The drawing represents one preferred embodiment of the invention and is not intended as an undue limitation on the generally broad scope of the invention as set out in the appended claims. Miscellaneous hardware such as certain pumps, compressors, condensers, heat exchangers, coolers, valves, instrumentation and controls have been omitted or reduced in number as not essential to a clear understanding of the invention, the utilization of such hardware being well within the purview of one skilled in the art.

In brief description, there is shown a catalytic reforming zone 1, a low pressure separator 4, a high pressure separator 14, and a plural stage absorber 16. The catalytic reforming zone is preferably operated at reforming conditions including a relatively low pressure of from about 85 to about 200 psig., and the low pressure separator is maintained at substantially the same pressure, allowing for pressure drop in the system, and at a temperature of from about 60° to about 120° F. The high pressure separator 14 and the plural stage absorber 16, are preferably maintained at a pressure of from about 350 to about 550 psig., and at a temperature of from about 0° to about 55° F. by means of a chiller 12 and a chiller 20. The temperature of said high pressure separator 14 and said absorber 16 is more preferably maintained at from about 35° to about 45° F.

While a plural stage absorber, such as herein contemplated, is commonly employed to absorb normally gaseous hydrocarbons from a hydrogen stream utilizing a countercurrent liquid hydrocarbon stream as the absorbent, primarily to recover a purified hydrogen stream, the absorber has heretofore been operated at a temperature of from about 90° to about 150° F. In this respect, reference is made to U.S. Pat. Nos. 3,520,799 and 4,212,726. However, in the recovery of hydrogen from the net excess hydrogen from a catalytic reforming process, it has now been found that operation of the plural stage absorber at a temperature of from about 0° to about 55° F., preferably at a temperature of from about 35° to about 45° F., and at an elevated pressure, preferably from about 350 to about 550 psig., not only results in the recovery of a purified hydrogen stream but also in the economic and unexpectedly high recovery of $C_2$–$C_4$ hydrocarbons, especially propane.

In a more specific description with reference to the attached drawing, a petroleum-derived naphtha fraction is introduced into the catalytic reforming zone 1 by way of line 2. A platinum-containing catalyst is contained in the reforming zone 1, and the reforming zone is maintained at reforming conditions including a pressure of about 145 psig. The total effluent from the reforming zone is recovered in line 3 and passed through a cooling means, not shown, into a low pressure separator 4 operated at a temperature of about 100° F. and at a pressure of about 105 psig.

A hydrogen-rich vapor phase which forms in the separator 4 is recovered via an overhead line 5 at approximately 29,800 moles per hour, and about 22,161 moles are diverted from line 5 into line 6 per hour for recycle to the catalytic reforming zone 1. This recycle stream is processed through a compressor 7 and reenters the reforming zone by way of line 8 at the aforesaid pressure of about 145 psig.

The balance of the hydrogen-rich vapor phase, comprising about 80.3 mol.% hydrogen, 5.2 mol.% ethane, 4.3 mol.% propane and 2.8 mol.% butane, is continued through line 9 to a compressor 10 wherein the gaseous stream is increased in pressure to approximately 515 psig. In practice, said pressure is more conveniently increased in stages making provision for adequate cooling to account for the heat of compression. However, in the interest of simplicity, only one compressor 10 is depicted, and the cooling means are not shown. In any case, the resulting higher pressured gaseous stream is discharged from the compressor 10 into line 11 and transferred into a chiller 12 operated at conditions to lower the temperature of said stream to about 40° F. Thus chilled, the two-phase stream is passed via line 13 into a high pressure separator 14 at a rate of about 7,639 moles per hour. The high pressure separator is maintained at a temperature of about 40° F. and at a pressure of about 510 psig. to produce a gaseous phase therein comprising about 84.8 mol.% hydrogen and about 15.1 mol.% of principally $C_1$-$C_5$ hydrocarbons. The liquid hydrocarbon phase that settles out is recovered through line 24 at a rate of about 414 moles per hour, said liquid phase being further processed as hereinafter related. The chilled gaseous phase of improved hyrogen purity is transferred via line 15 into a plural stage absorber 16 at a rate of about 7,225 moles per hour, and at the last mentioned conditions of temperature and pressure.

Referring back to the aforementioned low pressure separator 4, the liquid hydrocarbon phase that settles out therein is withdrawn through line 17 at a rate of about 3,536 moles per hour. This hdrocarbon stream comprises about 85.3 mol.% $C_6+$ hydrocarbons, and also about 14.4 mol.% $C_1$-$C_5$ hydrocarbons and 0.3 mol.% hydrogen. This light hydrocarbon-lean hydrocarbon stream, hereinafter referred to as a lean oil stream, is passed through a pump 18 and continued through line 19 to a chiller 20 in admixture with a hereinafter described lean oil stream from line 32. The combined lean oil stream is passed into the chiller 20 at a pressure of about 515 psig., said chiller being operated at conditions to provide an effluent lean oil stream reduced in temperature to about 40° F. The lean oil stream is then introduced into the absorber 16 via line 21.

In the absorber 16, the principally hydrogen stream from line 15, comprising about 15.1 mol.% $C_1$-$C_5$ hydrocarbons, passes upwardly through plural stages in contact with the gravitating lean oil from line 21. In the absorption process, effected at a temperature of about 40° F. and at a pressure in the 510-515 psig. range, a substantial portion of the light hydrocarbons contained in the hydrogen stream are absorbed in the gravitating lean oil stream, and a purified hydrogen stream comprising about 92.9 mol.% hydrogen is recovered through an overhead line 22 at a rate of about 6,495 moles per hour. This represents a 98.2% hydrogen recovery.

The lean oil stream, enriched by the absorbed light hydrocarbons, is recovered from the bottom of the absorber 16 by way of line 23, said recovery being at a rate of about 7,707 moles per hour. This hydrocarbon stream is combined with the aforementioned hydrocarbon stream from line 24, and the combined stream is continued through line 25 and introduced into a fractionator 26 at a rate of about 8,121 moles per hour. The fractionator 26 is maintained at a pressure of from about 200 to about 300 psig., preferably from about 250 to about 260 psig., a top temperature of from about 120° to about 200° F., preferably about 140° F., and a bottoms temperature of from about 400° to about 550° F., preferably about 500° F. At the preferred conditions of temperature and pressure, an overhead stream is recovered through line 27 at a rate of about 1,240 moles per hour. This overhead stream comprises about 26.9 mol.% ethane, representing a 77.4 mol.% recovery, about 30.3 mol.% propane, representing a 91.9 mol.% recovery, and about 27.0 mol.% butanes, representing an 88.6 mol.% recovery.

A bottoms fraction is recovered from the fractionator 26 via line 28 at a rate of about 6,882 moles per hour. About 3,441 moles per hour of said bottoms fraction is diverted into line 29 and passes through a pump 31 as a lean oil to be admixed with the aforementioned lean oil passing through line 19 as heretofore described. The balance of said bottoms fraction is continued through line 30 and recovered as the reformate product.

The improvement resulting from the practice of the present invention is particularly evident with respect to the recovery of ethane (77.4%) and propane (91.9%) as opposed to the 31.0% ethane recovery and the 69.6% propane recovery realized from the practice of the process of the aforementioned U.S. prior art patent U.S. Pat. No. 3,520,799, as calculated from the data presented therein.

I claim as my invention:

1. A process for converting hydrocarbons in the presence of hydrogen which comprises the steps of:
    (a) contacting said hydrocarbons with a catalyst in the presence of hydrogen at hydrocarbon conversion conditions to produce an effluent stream comprising hydrogen admixed with hydrocarbon conversion products;
    (b) separating said effluent at a relatively low pressure into a gaseous stream comprising hydrogen admixed with light hydrocarbon conversion products and a liquid stream comprising the heavier hydrocarbon conversion products;
    (c) contacting at least a portion of said gaseous stream with a hereinafter specified lean oil in a plural stage absorption zone at a relatively high pressure, and at a temperature of from about 0° to about 55° F., to produce a relatively pure hydrogen stream and a light hydrocarbon-enriched oil stream;
    (d) recovering the relatively pure hydrogen stream;
    (e) introducing the enriched oil stream into a fractionation zone at conditions to produce an overhead fraction comprising said light hydrocarbon conversion products, and a fraction comprising the heavier hydrocarbon conversion products; and,
    (f) combining the liquid hydrocarbon stream from step (b) with a portion of the heavier hydrocarbon fraction from step (e) and passing the combination into said plural stage absorption zone as said specified lean oil.

2. The process of claim 1 further characterized in that at least a portion of the gaseous stream from step (b) is returned to step (a) as at least a portion of said hydrogen.

3. The process of claim 1 further characterized in that the gaseous stream of step (b) is treated at a relatively high pressure, and at a temperature of from about 0° to about 55° F., to condense and separate a portion of said light hydrocarbon conversion products prior to further treatment of said stream in accordance with step (c).

4. The process of claim 1 further characterized in that said relatively low pressure is from about 85 to about 200 psig.

5. The process of claim 1 further characterized in that said relatively high pressure is from about 350 to about 550 psig.

6. The process of claim 1 further characterized with respect to step (f) in that said heavier hydrocarbon fraction from step (c) comprises from about 25 to about 75 vol.% of said combination.

7. The process of claim 1 further characterized in that said light hydrocarbon conversion products comprise $C_2$–$C_4$ hydrocarbons.

* * * * *